March 12, 1946.　　　J. R. PEACH　　　2,396,528
VEHICLE SUSPENSION
Filed July 27, 1944　　　2 Sheets-Sheet 1
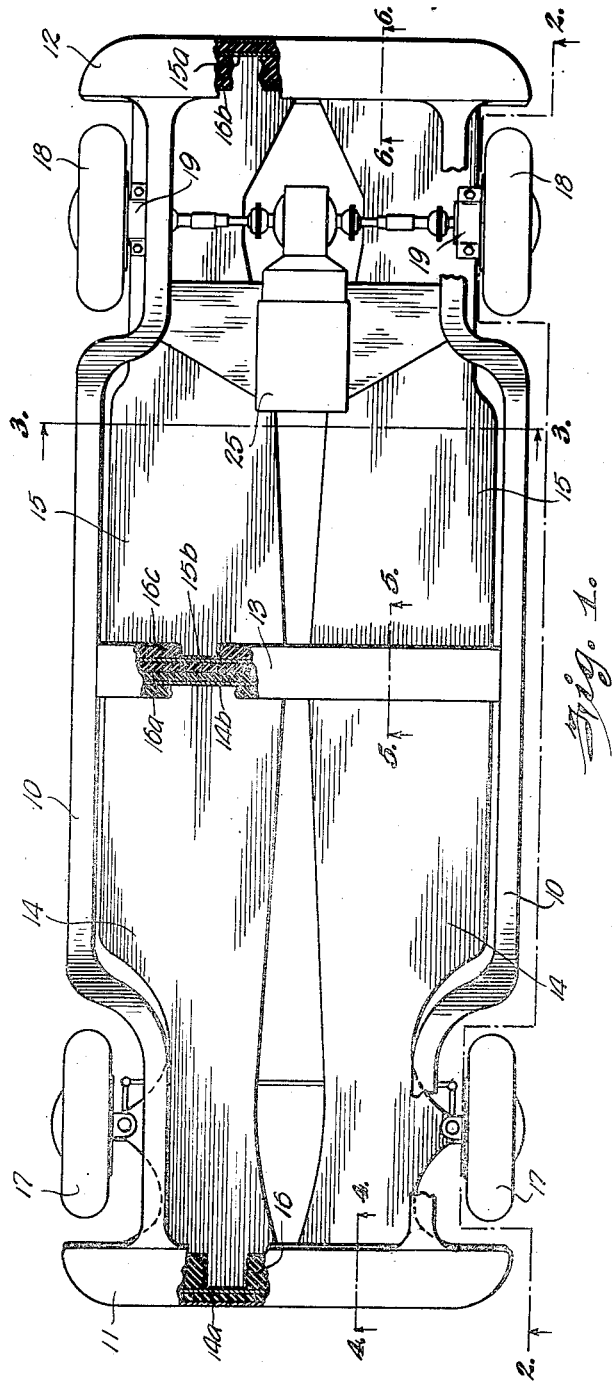
INVENTOR.
John R. Peach
BY
ATTORNEY.

March 12, 1946.  J. R. PEACH  2,396,528
VEHICLE SUSPENSION
Filed July 27, 1944  2 Sheets-Sheet 2

INVENTOR.
John R. Peach
BY Thos. C. Scofield
ATTORNEY.

Patented Mar. 12, 1946

2,396,528

UNITED STATES PATENT OFFICE 2,396,528

VEHICLE SUSPENSION

John R. Peach, Wichita, Kans.

Application July 27, 1944, Serial No. 546,800

4 Claims. (Cl. 280—106.5)

This invention relates to improvements in suspension for vehicles, including automotive vehicles, railway rolling stock and any vehicle which employs resilient mountings or suspension devices between the traction wheels and body or frame to minimize road shock, track irregularities and torque imposed by lateral movement of the wheels.

The salient novelty in the invention resides in mounting each wheel individually in separate axle and bearing assemblies, supporting the frame or body of the vehicle upon the wheels by means of longitudinal wheel supporting members which extend lengthwise of the frame and have resilient attachment at their ends to the frame. The individual mounting of the wheels serves to absorb road shock without affecting an adjacent wheel through an axle or through the vehicle frame. The individually mounted wheels produce a more stabilized torque whether power is transmitted through the wheel or not, since each wheel functions as a separate entity and is not dependent upon nor affected substantially by the other wheels.

The suspension stabilizes and improves riding qualities since the resilient connections or attachments between the wheel supporting members and frame have a double cushioning action absorbing upward or downward movement of the wheels in a manner similar to the action of a shock absorber in conventional mountings.

The suspension affords better load distribution, permits lowering of the center of gravity of the vehicle and the use of lighter frames since the torque is taken up by the wheel supporting members or suspension plates.

In the conventional spring mounted vehicle, whether the springs are leaf springs extending longitudinally or transversely of the vehicle or coil springs, the rear and front axles transmit the jolt and jar occasioned by road irregularities from one wheel to the other through the frame to all parts of the vehicle, whereas here, the wheels are individually mounted on separate wheel supporting members such as plates or frames extending longitudinally of the vehicle and resiliently attached only at their ends to the frame. The transmission of road shock, torque and other factors making for rough riding qualities are substantially reduced. As suggested, the suspension is adaptable to any type of vehicle including automotive vehicles, both passenger, trucks, trailers, as well as railroad rolling stock.

Figure 3:
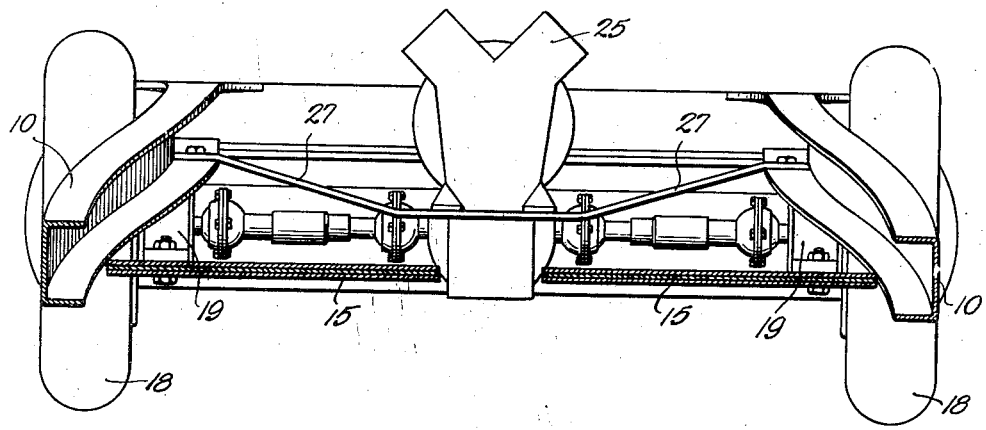
Figure 4:
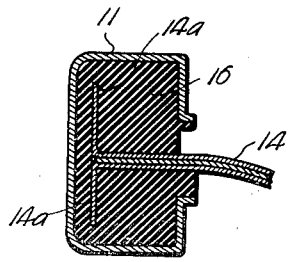
Figure 5:
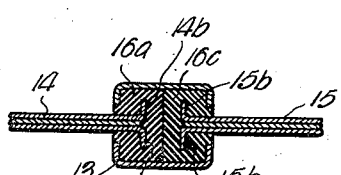
Figure 6:
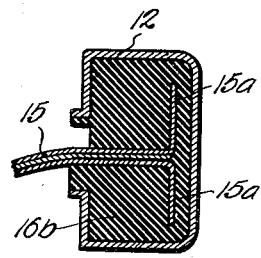
Figure 7:
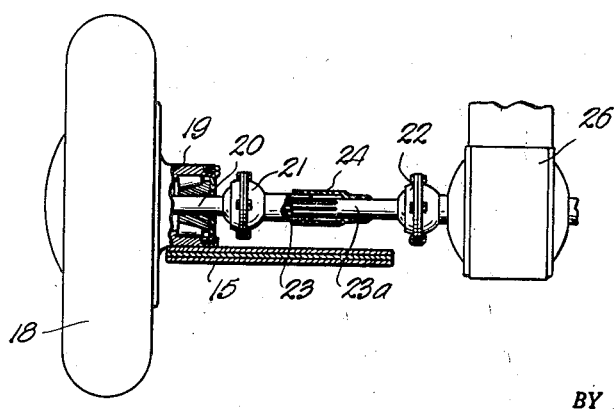

In the accompanying drawings which form a part of the instant specification and are to be read in conjunction therewith and in which like reference numerals are used to indicate like parts in the various views, Fig. 1 is a plan view of the frame suspension applied to an automotive vehicle, Fig. 2 is a side elevational view of the construction shown in Fig. 1, Fig. 3 is a view taken along the line 3—3 in Fig. 1 in the direction of the arrows, Fig. 4 is a sectional view of the front cross member taken along the line 4—4 in Fig. 1 in the direction of the arrows, Fig. 5 is a sectional view of the intermediate cross member taken on the line 5—5 in the direction of the arrows, Fig. 6 is a sectional view taken through the rear cross member along the line 6—6 of Fig. 1 in the direction of the arrows, Fig. 7 is a sectional view of one side of the rear axle and the bearing and wheel supporting member.

To facilitate and simplify an understanding of the invention, application has been made in the drawings to an automomotive vehicle and a railroad car. It will be noted that in both applications the wheels are individually mounted on separate axles and rotate in separate bearing assemblies. The bearings are mounted upon wheel supporting members which in the case of the automotive vehicle constitute plates extending longitudinally of the vehicle. In the railway car truck the wheel supporting members are parallel beams with transverse end members in the form of flanges, forming a frame-like structure which takes the place of the conventional truck frame. These end members have flexible attachment to cross members of the car frame. In the automotive application the wheel supporting plates likewise terminate in transverse flanges which have flexible attachment with cross members of the frame.

The flexible or resilient attachment between the wheel supporting members and the frame is in all cases indicated as a solid rubber body enclosed within a casing having the flanged end members of the truck frame and the flanged end members of the wheel supporting plates imbedded therein. By this showing it is not intended to limit the resilient attachment of the wheel supporting members to this type of structure since spring or hydraulic mountings may be used as well. It is only essential that the wheel supporting members have a flexible attachment with the frame in order that road shock, torque and other stresses be minimized.

The invention will first be described with respect to its application to an automotive vehicle as shown in Figs. 1 to 7, inclusive. The vehicle may be a passenger car, truck, trailer, or any type of vehicle driven by a prime mover such as an internal combustion engine. In the drawings the vehicle is driven by a motor positioned at the rear of the car, but by this showing it is not intended to limit the invention to a rear drive.

Referring to Fig. 1, there is shown in plan view a vehicle frame consisting of longitudinal side members 10, a front cross member 11, a rear cross member 12 and an intermediate cross member 13. The wheel supporting members consist of front and rear plates extending longitudinally of the frame. The front plates are designated by the numerals 14, the rear plates by numerals 15. These plates are preferably laminated, being built up of a plurality of plys of sheet metal as shown in Fig. 3. The stiffness or flexibility of the plates will depend upon the service in which the vehicle is to be used. In passenger car service considerably more flexibility is desirable than in truck service where heavy loads are to be supported. The number of plys or sheets and the thickness of each sheet will be governed by the foregoing conditions.

The sectional views of the front and rear cross members shown in Figs. 4 and 6 show in greater detail the cross member construction and the resilient attachment between the cross members and the wheel supporting plates. The front ends of plates 14 terminate in flanges 14a which are imbedded with the ends of the plates 14 in a block of resilient material such as rubber shown at 16. The rear end of plates 14 are likewise flanged as shown at 14b in Fig. 5. These flanges, as well as the rear ends of the plates, are imbedded in a block of resilient material 16a enclosed within the intermediate cross member housing 13.

The rear plates 15 are similarly attached to the frame. Flanges 15a with the ends of the plates are imbedded in a resilient substance 16b enclosed within the housing 12 of the rear cross member. Flanges 15b and the front end of plates 15 are imbedded in a block of resilient material 16c enclosed within cross member housing 13, but separate from the block of resilient material 16a so that stresses upon the front plates are not transmitted to the rear plates. Besides imbedding the plates and flanges in the resilient material an intimate bond is made between the metallic and resilient substances in order that the stresses imposed upon the plates are evenly distributed throughout the resilient blocks.

The front wheels 17 are mounted on individual axles which rotate in bearings shown diagrammatically at 18 in Fig. 2. These bearings are fixedly attached to plates 14 as shown in Figs. 1 and 2. Conspicuous in its absence is the usual or conventional axle which ties together the two front wheels. The wheels therefore are supported at the outer edges of the individual plates 14 and are tied into the frame of the vehicle by their end flanges which are imbedded in the resilient material of the cross members. The usual facilities for steering are shown diagrammatically in Figs. 1 and 2.

The rear wheels 18 are likewise individually mounted at the outer edges of the rear plates 15 as shown in Figs. 1, 3, and 7. On the plates 15 are bolted the roller bearing housings 19 detailed in Fig. 7. The wheel axles 20 are carried by the roller bearings and have a universal joint enclosed within housings 21 inboard of the bearings. A second universal joint is enclosed within housings 22 and between the joints is a splined shaft 23 and 23a enclosed within a surrounding housing 24.

The drive to the rear wheels is from the power source 25 through gearing, not shown, and the differential enclosed within the differential housing 26, thence through transverse shafts from opposite sides of the differential housing through the universal joints and splined shafts to the wheel axles as shown in Fig. 7. The individual bearings which carry the axles of the rear wheels being mounted on the separate rear plates 15 and driven through splined shafts from the differential function as separate units. In other words, road shock, torque, or lateral stresses to which the individual wheels are subjected are absorbed almost entirely within the respective wheel supporting members and transmission through an axle or through the frame to another part of the body is to a great extent minimized.

The prime mover and differential housing are mounted as a unit on transverse supports 27 which bridge the space between the longitudinal frame members.

Both the frame and wheel supporting plates are cut away to permit mounting of the front and rear wheels and turning of the front wheels in driving the vehicle.

From the foregoing it will be seen that the invention is well adapted to attain all of the ends and objects hereinbefore set forth together with other advantages which are obvious and which are inherent to the structure. As many possible embodiments may be made of the invention without departing from the scope thereof, it is to be understood that all matter herein set forth or shown in the drawings is to be interpreted as illustrative and not in a limiting sense.

Having thus described my invention, I claim:

1. Suspension for vehicles in which the traction wheels are mounted on individual axle and bearing assemblies which support the body frame of the vehicle through resilient mountings, said mountings comprising wheel supporting members extending longitudinally of the frame, cross members transverse the frame adjacent both ends and intermediate its ends and resilient attachments between the wheel supporting members and the cross members interiorly of the frame.

2. Suspension for vehicles in which the traction wheels are mounted on individual axle and bearing assemblies which support the body frame of the vehicle through resilient mountings, said mountings comprising wheel supporting members extending longitudinally of the frame, cross members transverse the frame adjacent both ends and intermediate its ends and webs of resilient material within said cross members, the ends of the wheel supporting members securely anchored in said resilient material.

3. Suspension for vehicles in which the traction wheels are mounted on individual axle and bearing assemblies which support the body frame of the vehicle through resilient mountings, said mountings comprising wheel supporting members extending longitudinally of the frame flanges on the ends of said supporting members, cross members transversely of the frame adjacent both ends and intermediate its ends, and webs of resilient material within said cross members, the flanges of said wheel supporting members embedded in the webs of resilient material.

4. Suspension for vehicles in which the traction wheels are mounted on individual axle and bearing assemblies which support the body frame of the vehicle through resilient mountings, said mountings comprising front and rear wheel supporting members, cross members transverse the frame ahead of the front wheels and behind the rear wheels and intermediate the front and rear wheels and webs of resilient material within said cross members, said front wheel supporting members anchored at their ends in the resilient material in the front and intermediate cross members, said rear wheel supporting members anchored at their ends to the resilient material within the rear and intermediate cross members.

JOHN R. PEACH.